United States Patent
Eisele et al.

(10) Patent No.: US 9,201,138 B2
(45) Date of Patent: Dec. 1, 2015

(54) PHOTON DETECTOR WITH A PARALYZABLE PHOTON-SENSITIVE ELEMENT, IN PARTICULAR SPAD, AND DISTANCE MEASURING DEVICE COMPRISING SAID TYPE OF PHOTON DETECTOR

(75) Inventors: Andreas Eisele, Leinfelden-Echterdingen (DE); Oliver Wolst, Singapore (SG); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 772 days.

(21) Appl. No.: 13/395,425

(22) PCT Filed: Jul. 15, 2010

(86) PCT No.: PCT/EP2010/060232
§ 371 (c)(1),
(2), (4) Date: Jul. 4, 2012

(87) PCT Pub. No.: WO2011/029646
PCT Pub. Date: Mar. 17, 2011

(65) Prior Publication Data
US 2012/0261547 A1    Oct. 18, 2012

(30) Foreign Application Priority Data

Sep. 11, 2009  (DE) .......................... 10 2009 029 376

(51) Int. Cl.
*G01S 7/491*    (2006.01)
*G01S 7/481*    (2006.01)
(Continued)

(52) U.S. Cl.
CPC ................. *G01S 7/4816* (2013.01); *G01J 1/04* (2013.01); *G01J 1/0403* (2013.01); *G01J 1/0411* (2013.01);
(Continued)

(58) Field of Classification Search
CPC ......... G01J 1/04; G01J 1/0403; G01J 1/0411; G01J 1/0437; G01J 1/22; G01J 1/42; G01S 7/10; G01S 7/4816; G01S 7/489
USPC ............... 250/206, 221, 222.2, 214.1, 214 R; 359/237, 330, 341.3
See application file for complete search history.

(56) References Cited

U.S. PATENT DOCUMENTS 4,973,125 A    11/1990 Normandin
7,488,925 B2 *  2/2009 Makita et al. ................. 250/206
(Continued)

FOREIGN PATENT DOCUMENTS

CN    1471657 A    1/2004
CN    1926727 A    3/2007
(Continued)

OTHER PUBLICATIONS

International Search Report corresponding to PCT Application No. PCT/EP2010/060232, mailed Oct. 18, 2010 (German and English language document) (7 pages).

*Primary Examiner* — Seung C Sohn
(74) *Attorney, Agent, or Firm* — Maginot, Moore & Beck LLP

(57) ABSTRACT

A photon detector is disclosed that includes, in addition to an immobilizable photon-sensitive element, a photon transmission element. The photon detector is configured such that it can vary photon intensities impacting upon the photon-sensitive element and transmitted by the photon transmission element, for example, by modifying an absorption property or a defocusing property of the photon transmission element. Also, the immobile photon-sensitive element, which can be, for example a SPAD (Single Photon Avalanche Diode), always operates close to the optimal operating range and below an immobilization range. A distancing device that includes this type of photo detector is also disclosed.

11 Claims, 3 Drawing Sheets

(51) Int. Cl.
*G01J 1/04* (2006.01)
*G01J 1/22* (2006.01)
*G01J 1/42* (2006.01)
*G01S 7/497* (2006.01)
*G01S 17/10* (2006.01)
*G01S 7/489* (2006.01)

(52) U.S. Cl.
CPC .............. *G01J 1/0418* (2013.01); *G01J 1/0437* (2013.01); *G01J 1/0448* (2013.01); *G01J 1/22* (2013.01); *G01J 1/42* (2013.01); *G01S 7/497* (2013.01); *G01S 17/10* (2013.01); *G01S 7/489* (2013.01); *G02F 2203/52* (2013.01)

(56) References Cited

U.S. PATENT DOCUMENTS

| 8,249,454 | B2 * | 8/2012 | Sugawara et al. ............... 398/72 |
| 2007/0086076 | A1 | 4/2007 | Makita et al. |
| 2007/0182949 | A1 * | 8/2007 | Niclass ............................ 356/3 |

FOREIGN PATENT DOCUMENTS

| EP | 1 327 905 A1 | 7/2003 |
| WO | 2005/084397 A2 | 9/2005 |
| WO | 2006/083349 A2 | 8/2006 |

\* cited by examiner

PHOTON DETECTOR WITH A PARALYZABLE PHOTON-SENSITIVE ELEMENT, IN PARTICULAR SPAD, AND DISTANCE MEASURING DEVICE COMPRISING SAID TYPE OF PHOTON DETECTOR

This application is a 35 U.S.C. §371 National Stage Application of PCT/EP2010/060232, filed on Jul. 15, 2010, which claims the benefit of priority to Serial No. DE 10 2009 029 376.0, filed on Sep. 11, 2009 in Germany, the disclosures of which are incorporated herein by reference in their entirety.

BACKGROUND

The disclosure relates to a photon detector comprising at least one paralyzable photon-sensitive element, wherein the photon-sensitive element can be embodied for example with an SPAD (Single Photon Avalanche Diode). Furthermore, the disclosure relates to a distance measuring device comprising such a photon detector.

Distance measuring devices are known which align a temporally modulated light beam in a direction toward a target object whose distance from the measuring device is intended to be determined, and at least partly detect the light reflected or backscattered from the target object aimed at and use it for determining the distance to be measured. In this case, a typical measurement range is in a range of distances of from a few centimeters up to several hundred meters.

In order to be able to measure the distance from the target object, a propagation time of photons which are emitted from the measuring device toward the target object and are detected in the measuring device after returning can be determined and the desired distance can be determined therefrom. By way of example, short light pulses can be emitted and a propagation time of a light pulse from emission until detection can be measured. Alternatively, a light beam can be temporally modulated in terms of its intensity, for example by means of a periodic modulation of the light intensity, and a phase shift between the emitted and detected light signal can be used to determine the propagation time and thus the distance from the target object. The principle of laser distance measurement is generally known by the designation "time of flight ranging" for example with continuous modulation of the intensity of the laser beam.

In order that the light returning from target object, and in particular the temporal modulation of said light, can be detected well and, if necessary, distinguished from background light, it can be advantageous to use light detectors, which are also designated herein as photon detectors, having specific properties. By way of example, distance measuring devices have been developed in which the returning light is detected with the aid of SPADs. SPADs can enable a very good detection sensitivity through to the detection of individual photons. In contrast to many other light detectors, wherein the output signal is analog and the strength of the output signal is dependent on the incident light intensity, SPADs can provide a digital signal with pulses having substantially the same strength, wherein each pulse indicates the detection of a photon and, consequently, the digital signal supplied by the SPAD reproduces a photon counting rate. One possible advantage of the use of SPADs as light detectors may reside in the fact that SPADs can be produced compatibly with CMOS technology and, consequently, can be integrated cost-effectively for example into an integrated circuit for the evaluation of the measurement signals.

However, it has been observed that distance measuring devices which use SPADs for detecting returning light, particularly in very light-intensive measurement conditions, cannot yield sufficiently reliable measurement results.

SUMMARY

There may be a need for a distance measuring device or a photon detector suitable for such a measuring device which permit reliable distance determination or photon detection in different light conditions.

It has been observed that certain photon-sensitive elements such as SPADs, for example, after the impingement of a photon, cannot be activated anew for a certain dead time, which can be in the range of 1 to 100 ns, for example. In this context, this is also referred to as a paralyzable response behavior. As illustrated schematically for example in FIG. 4 (see curve 101), the counting rate determined by an individual SPAD, at a low rate of absorbed photons, can be approximately proportional to the photon absorption rate. However, the counting rate can start to saturate at a photon absorption rate of somewhat less than the inverse dead time $1/\tau$ of the SPAD. At even higher photon absorption rates, the counting rate can even decrease, since, at such high photon absorption rates, the SPAD is already triggered again before it has completely recovered from a preceding detection event, with the result that individual detection events are no longer necessarily signaled by individual detection signals, rather the SPAD can supply a lengthened output signal, which can correspond to a lengthened dead time of the SPAD. The efficiency of a paralyzable detector such as an SPAD, for example, can thus decrease greatly at high photon currents, in particular as soon as the photon rate absorbed by the SPAD becomes high relative to the inverse dead time of the SPAD.

One concept of the present disclosure is based, on account of the advantages described, on using a paralyzable photon-sensitive element such as, for example, an SPAD for a photon detector and additionally equipping the photon detector with a photon transmission element designed to vary a photon intensity transmitted by the photon transmission element and impinging on the photon-sensitive element.

In this case, the photon intensity can be understood to be the rate of photons which impinge per unit time on the detection area of the photon-sensitive element, specified in $s^{-1}m^{-2}$. Alternatively, the photon intensity can also be understood in a direct relationship with the incident light power per area, specified in watts $m^{-2}$.

In order to vary the photon intensity transmitted by the photon transmission element, the photon transmission element can be designed to vary its photon absorption properties. By way of example, it can be favorable to arrange in the beam path upstream of the photon-sensitive element a photon transmission element, the absorption properties of which can be changed actively or passively, such that light impinging on the photon detector firstly has to pass through the photon transmission element and is partly absorbed there, before it impinges on the photon-sensitive element with a possibly reduced photon intensity. In this case, the absorption properties can change across the entire area of the photon transmission element, preferably homogeneously.

Alternatively, the photon transmission element can also be embodied as an aperture stop or iris. A transmitted photon intensity can be varied by corresponding opening or closing of the iris. To put it another way, the absorption properties of the photon transmission element embodied as an iris change with the current setting of the iris.

The photon transmission element can also be designed to reduce the transmitted photon intensity by defocusing. In other words, a photon transmission element can be configured in such a way that transmitted light is defocused in a targeted manner, that is to say that, for example, the cross section of a transmitted light beam is expanded in a targeted manner in order in this way to reduce the photon intensity, that is to say the number of photons occurring per area. If appropriate, the light can even be defocused to such a great extent that all photons entering the photon detector no longer actually impinge on the photon-sensitive element.

It can be advantageous to configure the photon detector in such a way that the photon intensity transmitted by the photon transmission element and impinging on the photon-sensitive element is varied in a manner dependent on the photon intensity impinging on the photon transmission element. In other words, by way of example, the absorption properties or the defocusing properties of the photon transmission element can be varied depending on the incident photon intensity. By way of example, the photon transmission element can absorb to a greater extent or defocus to a greater extent at high incident photon intensity than at low photon intensity. In this way, the photon intensity impinging on the paralyzable photon-sensitive element can be adapted to the properties of said photon-sensitive element by means of the photon intensity that impinges on the photon detector from outside being suitably reduced by the photon transmission element beforehand.

In particular, it can be advantageous to contribute to maximizing a photon counting rate of the paralyzable photon-sensitive element by varying the photon intensity transmitted by the photon transmission element and impinging on the photon-sensitive element.

By way of example, it can be favorable, at very high photon intensities such as can occur for example on account of very strong background light during the measurement, to reduce a photon intensity impinging on the photon-sensitive element with the aid of the photon transmission element in such a way that on the one hand, the photon-sensitive element is irradiated with enough light to keep a signal-to-noise ratio high, but, on the other hand, the amount of light that impinges is not too much, since otherwise the counting rate of the photon-sensitive element could decrease again on account of its paralyzable behavior and the overall efficiency of the photon detector could thus be reduced.

The photon transmission element can be designed to vary the transmitted photon intensity passively in a manner dependent on a photon intensity impinging on the photon transmission element. In this case, "passively" can mean that an active regulation and/or an energy supply of the transmitting photon transmission element can be dispensed with and the latter can instead change its optical properties automatically. By way of example, the photon transmission element can be embodied with a photochromic material, which automatically becomes tinted under light incidence, such that an absorption is all the higher, the higher the impinging photon intensity. As an alternative or supplementarily to this, the photon detector can additionally comprise a photon intensity measuring unit and a control unit, and be designed to vary the photon intensity transmitted by the photon transmission element with the aid of the control unit actively in a manner dependent on a photon intensity measured by the photon intensity measuring unit. In this case, the photon intensity measuring unit can be embodied, for example, as a separate light sensor which measures an impinging light intensity and forwards a corresponding measurement signal to the control unit, which thereupon correspondingly drives the photon transmission element.

Alternatively, the photon-sensitive element of the photon detector itself can also serve as a photon intensity measuring unit in order to conduct a measurement signal indicating the incident photon intensity to the control unit, such that the latter can correspondingly drive the photon transmission element and the photon sensor can thus regulate itself with regard to the photon intensity impinging on the photon-sensitive element. By way of example, a first measurement can be carried out and the counting rate can be determined. The absorption of the photon transmission element can thereupon be changed and a second measurement can be carried out. The counting rate of the second measurement can then be compared with the first, the higher rate can be selected and the optimum or sufficiently good setting of the photon transmission element can thus be determined iteratively.

By way of example, active influencing of the optical properties of the photon transmission element can be realized by the photon transmission element being embodied with liquid crystals. In this case, the photon transmission element can be designated as a variable liquid crystal attenuator. Alternatively, different filters having inhomogeneous transmission or absorption properties can correspondingly be inserted or pivoted into a light path within the photon detector. By way of example, a wedge composed of absorbent material can be inserted to different extents into the beam path within the photon detector, such that the optical path length covered by the incident photons can be varied within the absorbent wedge and the transmitted photon intensity can thus be set correspondingly. Alternatively, an optical element in the form of dielectric layers stacked one above another, in a manner similar to that in the case of a dielectric mirror, can be introduced into the beam path and, by changing the angle of the optical element with respect to the beam course, it is possible to correspondingly influence the reflection or transmission by the optical element. As a further alternative, polarization filters rotatable relative to one another can also be used as an adjustable photon transmission element.

The abovementioned possibilities of active or passive influencing of the optical properties of the photon transmission element can be realized individually or else in combination with one another.

The photon transmission element can be embodied as an additional structural element with respect to the paralyzable photon-sensitive element in the photon detector and comprise one or more components. Alternatively, the photon transmission element can be embodied together with one or more optical component(s) present anyway in the photon detector. By way of example, an optical component situated in the optical beam path of the photon detector can be embodied with a layer whose transmission is variable, for example composed of a self-tinting material. In this way, by way of example, an additional mechanical receptacle for a filter can be dispensed with and the complexity, structural size and costs can thus be reduced. A filter in the detector-chip package is also conceivable.

To summarize, one aspect of the disclosure can be seen in arranging an optical attenuator or defocusing element upstream of a paralyzable photon-sensitive element, wherein the attenuator/defocusing element can reduce the number of photons incident on the photon-sensitive element in a manner dependent on the photon intensity. The combination of paralyzable photon-sensitive element and photon transmission element whose transmission is variable can greatly increase the number of detected photons in the range of high optical intensities, by virtue of the fact that the incident light intensity is greatly attenuated and can thus be shifted into an optimum working range of the paralyzable detector. At the same time, the arrangement in the range of low optical intensities can keep the signal losses low, by virtue of the fact that only a low optical attenuation of the impinging light is effected at low light intensity.

In the measurement of optical signals, the signal-to-noise ratio generally increases with an increasing number of impinging photons which are detected on a detector, that is to say contribute to the detection signal. In the case of paralyzable detectors there is a range in which increasing optical intensity can have the effect that the number of detected photons decreases, as can be discerned on the right-hand side of the figure illustrated in FIG. 4. In this range, the signal-to-noise ratio can be increased by targeted attenuation of the photon intensity impinging on the paralyzable detector.

If the photon detector described is used for example in a distance measuring device, sometimes also designated as a laser distance measuring device, for the optical measurement of a distance from a target object, then the function of the distance measuring device is usually greatly dependent on the signal-to-noise ratio. On account of the described properties of the photon detector, therefore the working range of the distance measuring device can be extended toward higher optical intensities and a signal-to-noise ratio (SNR) can thus be increased. This can contribute, in particular, to an increase in a dynamic range for example for measurements in bright sunlight or in dark areas. On the other hand, possibly an increase in the statistical accuracy of a measured value can be achieved with the measurement time remaining the same or a shortening of the necessary measurement time can be achieved with the statistical accuracy remaining the same.

Possible aspects, advantages and configurations of the disclosure have been described above with reference to individual embodiments of the disclosure. The description, the associated figures and the claims contain numerous features in combination. A person skilled in the art will also consider these features, in particular also the features of different exemplary embodiments, individually and combine them to form expedient further combinations.

BRIEF DESCRIPTION OF THE DRAWINGS

Embodiments of the disclosure and partial aspects contained therein are described below with reference to the accompanying figures. The figures are merely schematic and not true to scale. Identical or similar reference symbols in the figures designate identical or similar elements.

DETAILED DESCRIPTION

Figure 1:
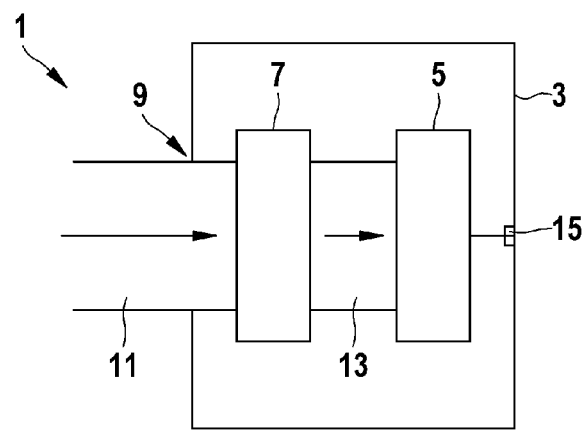
FIG. 1 shows a photon detector with a passively operating photon transmission element in accordance with one embodiment of the present disclosure.

FIG. 1 shows a photon detector 1, in which a paralyzable photon-sensitive element 5 and a photon transmission element 7 are arranged within a housing 3. An externally impinging light beam 11 enters through a window 9 into the housing 3 and firstly impinges on the photon transmission element 7. In this case, the photon transmission element 7 is an at least partly transparent optical structural element composed of a photochromic material which has a higher light absorption at higher light intensity. One example of a photochromic material could be phenanthropyran. What can thereby be achieved is that a light beam 13 which is transmitted by the photon transmission element 7 and which ultimately impinges on the paralyzable photon-sensitive element 5 does not have an excessively high photon intensity, even if the incident light beam 11 should have a very high light intensity. The events detected by the photon-sensitive element 5 are output at an output 15.

In the exemplary embodiment illustrated, the paralyzable photon-sensitive element is embodied with the aid of an SPAD. With a probability described by the PDP (photon detection probability), a photon impinging on the SPAD triggers an avalanche breakdown of the diode, which can be detected as a pulse at the output. After the breakdown, the SPAD has to be biased again in order to be able to be sensitive to a further photon, that is to say to be able to generate a further detector pulse. The time within which the SPAD cannot be excited anew is designated as the dead time τ. If a photon impinging on account of the charging process or recovery process of the SPAD generates a further avalanche breakdown before the bias voltage threshold required for generating a detector pulse has been reached, the dead time can be lengthened. The detector can be paralyzed. The number k of photons which, assuming a poisson distribution, during a time interval $\Delta T$, can be detected by a paralyzable photon-sensitive element with the dead time τ can be described as $$k = \Delta T \cdot N \cdot \exp(-N \cdot \tau)$$

where N is the absorbed photon rate.

Figure 4:
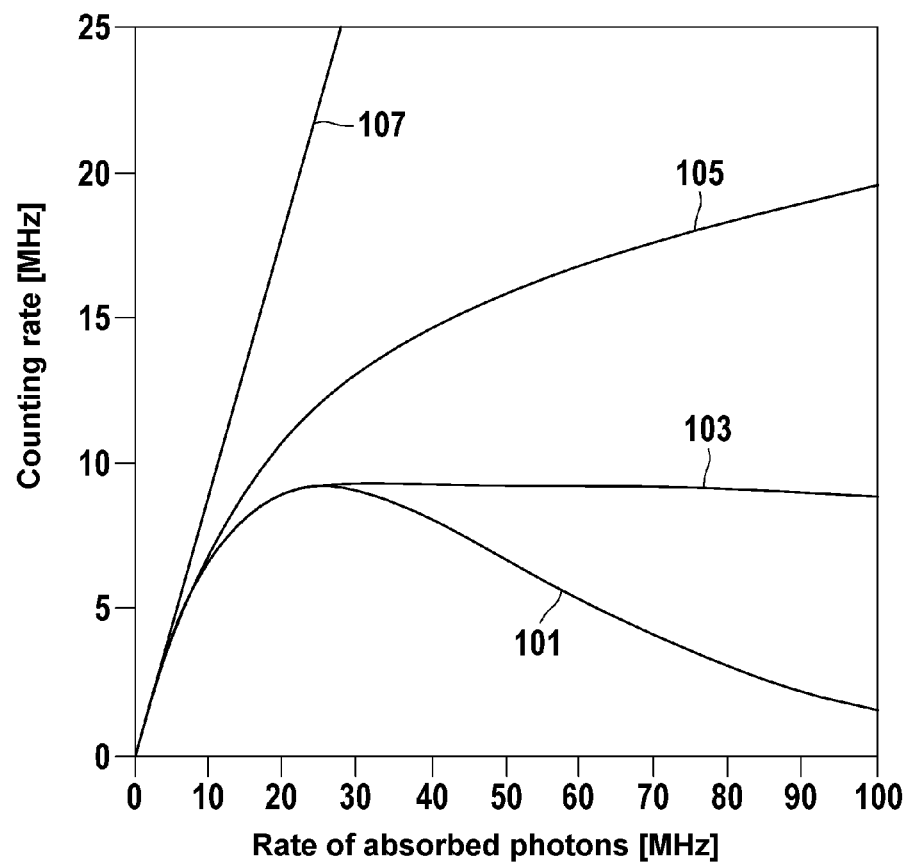
FIG. 4 shows a graph of a counting rate as a function of a rate of absorbed photons for different types of detectors.

FIG. 4 shows the curve 101 the behavior of the counting rate of a paralyzable detector as a function of the rate of absorbed photons. For a paralyzable detector, the number of detected photons has a maximum which is approximately 25 MHz in the case of the curve 101 illustrated. A further increase in the rate of absorbed photons reduces the number of detected photons. During operation in this regime, that is to say the paralyzation range, in which at least a partial paralyzation of the photon-sensitive element occurs on account of a very high photon intensity, a reduction of the photon intensity of the transmitted light 13 impinging on the photon-sensitive element 5 can have the effect that the number of detectable photons can be increased. Alongside maximizing the counting events, a reduction of the impinging photon intensity that is brought about by the photon transmission element 7 can also be used to increase a dynamic range of the photon detector. It is possible to choose such a great reduction of the photon intensity by the photon transmission element 7 that the photon-sensitive element 5 is always operated below the paralyzation range, such that it can be used for intensity measurement. In this case, the counting event density is no longer necessarily proportional to the light intensity of the incident light beam 11, but can nevertheless enable the detection of momentary light intensity fluctuations such as can occur, for example, when measurement light 11 periodically modulated temporally in terms of intensity is incident in laser distance measuring devices.

The curve 103 in FIG. 4 shows an idealized behavior of a photon detector in accordance with one embodiment of the present disclosure. At low rates of absorbed photons, for instance in the range below 10 MHz, the photon detector exhibits a linear response behavior. In the range of approximately 10 MHz to approximately 25 MHz, the response behavior of the photon detector starts to saturate. While a conventional paralyzable photon-sensitive element has a decreasing counting rate, however, at even higher rates of absorbed photons, as is illustrated in the curve 101, what can be achieved in the case of the photon detector according to the disclosure with the aid of the variable photon transmission element is that, even at high rates of absorbed photons, the number of photons impinging on the photon-sensitive element is always only such that said element is operated approximately at the optimum operating point. In other words, the photon transmission element can be set in such a way that the transmitted light has a photon rate of approximately 20-30 MHz on average. In this case, momentary fluctuations of the incident photon intensity are preferably not compensated for by the photon transmission element, with the result that such momentary intensity fluctuations can still be detected by the photon-sensitive element.

Merely for comparison purposes, FIG. 4 also reproduces with the curve 107 an ideally linear response behavior and with the curve 105 a response behavior of a non-paralyzable photon-sensitive element affected by a dead time τ.

Figure 2:
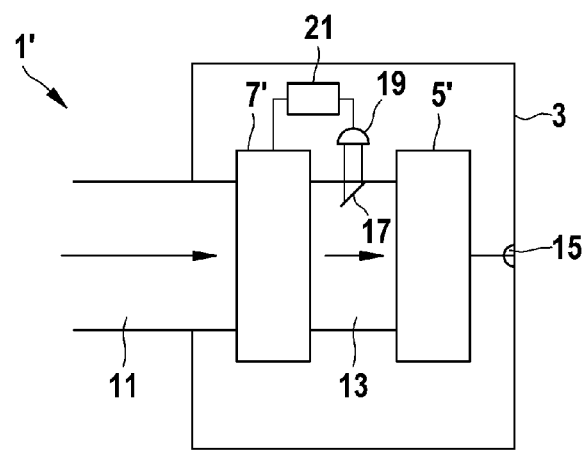
FIG. 2 shows a photon detector with an actively controlled photon transmission element in accordance with one embodiment of the present disclosure.

FIG. 2 shows an alternative embodiment of a photon detector 1'. A small mirror 17 is arranged in the transmitted beam 13, said mirror directing part of the transmitted light onto a photon intensity measuring unit 19 for example in the form of a conventional light-sensitive diode. A photon intensity measured by the diode is conducted to a control or regulating unit 21, which thereupon actively controls or regulates the photon transmission element 7' with regard to its transmitted photon intensity. In this case, the photon transmission element can be configured as a partly transmissive, variable liquid crystal attenuator, in which a light transmission property can be set depending on the signal applied by the control unit 21.

Figure 3:
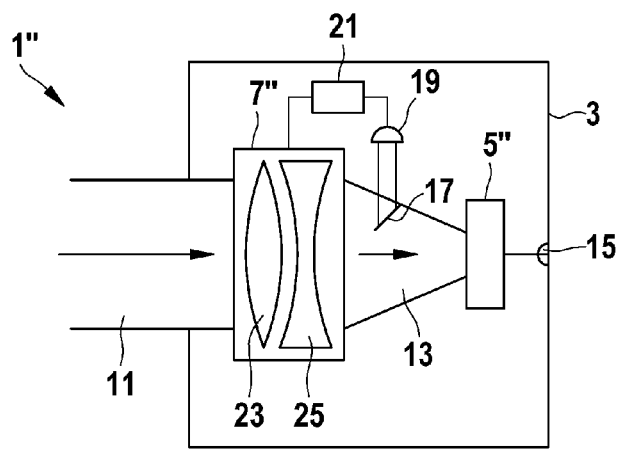
FIG. 3 shows a photon detector with controlled active defocusing in accordance with one embodiment of the present disclosure.

FIG. 3 shows an alternative configuration of a photon detector 1" in accordance with a further embodiment of the present disclosure. In this case, the photon transmission element 7" is designed, with the aid of second lenses 23, 25 displaceable relative to one another, to focus a transmitted light beam 13 to a greater or lesser extent. Depending on the driving by the control unit 21, therefore the incident light 11 is focused by the photon transmission element 7" onto a partial area of the photon-sensitive element 5" of greater or lesser size and the impinging photon intensity is thus varied.

Figure 5:
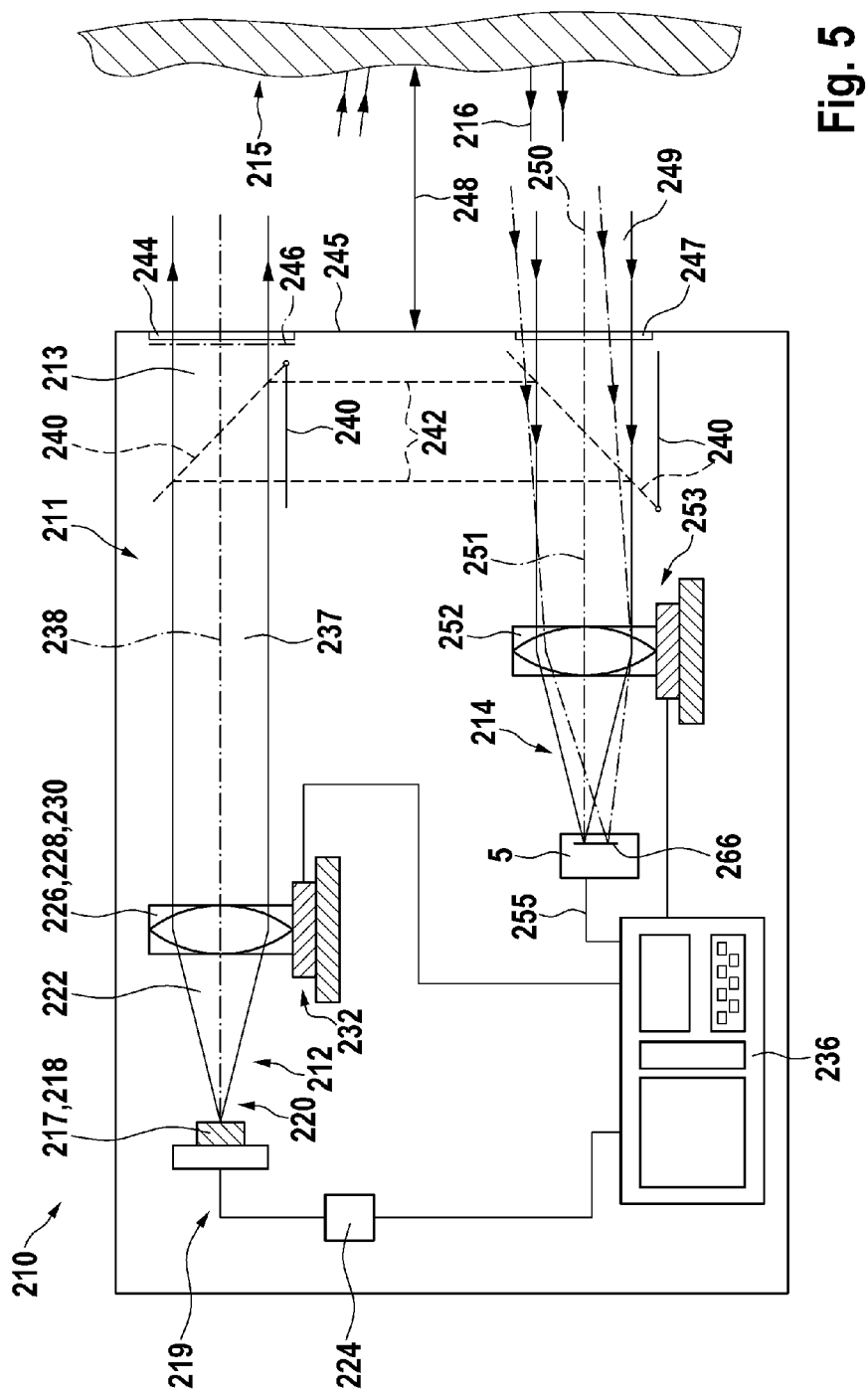
FIG. 5 shows a distance measuring device for optical distance measurement in accordance with one embodiment of the present disclosure.

FIG. 5 schematically illustrates a distance measuring device 210 for optical distance measurement according to the disclosure with the most important components for describing its function.

The distance measuring device 210 comprises a housing 211, in which a photon source 212 for emitting optical measurement radiation 213 and a photon detector 214 for detecting measurement radiation 216 returning from a target object 215 are arranged.

The photon source 212 comprises a light source, which is realized by a semiconductor laser diode 218 in the exemplary embodiment illustrated. The laser diode 218 emits a laser beam 220 in the form of a light bundle 222 visible to the human eye. For this purpose, the laser diode 218 is operated by means of a control unit 224, which, by means of corresponding electronics, generates a temporal modulation of an electrical input signal 219 of the laser diode 218. What can be achieved by such modulation of the diode current is that the optical measurement radiation 213 utilized for distance measurement is likewise modulated temporally in terms of its intensity in a desired manner.

The laser beam bundle 220 subsequently passes through a collimation optical unit 226 in the form of an objective 228, which is illustrated in the form of an individual lens in a simplified manner in FIG. 5. In this exemplary embodiment, the objective 228 is optionally situated on an adjusting assembly 232, which, in principle, makes it possible to change the position of the objective in all three spatial directions, for example for alignment purposes.

Alternatively, however, the collimation optical unit 226 can also already be part of the laser diode 218 or fixedly connected thereto.

After passing through the objective 228, this results in a, for example amplitude-modulated, signal of the measurement radiation 213 in the form of an almost parallel light bundle 237, which propagates along an optical axis 238 of the photon source 212.

In addition, a preferably switchable beam deflector 240 can also be situated in the photon source 212, and allows the measurement radiation 213 to be deflected wholly or partly whilst bypassing the target object 215 directly, that is to say device-internally, onto the photon detector 214. In this way it is possible to generate a device-internal reference path 242, which allows calibration or adjustment of the distance measuring device.

If a distance measurement is carried out by means of the distance measuring device 210, the measurement radiation 213 leaves the housing 211 of the distance measuring device through an optical window 244 in the end wall 245 of the measuring device 210. The opening of the optical window 244 can be protected for example by a shutter 246. For the purpose of actual measurement, the distance measuring device 210 is then aligned toward a target object 215 whose distance 248 from the distance measuring device 210 is intended to be determined. The signal 216 reflected or scattered at the desired target object 215 forms retaining optical measurement radiation 216 in the form of a retaining beam bundle 249 or 250, a certain portion of which passes back into the distance measuring device 210 again.

Through an entrance window 247 at the end side 245 of the distance measuring device 10, the returning measurement radiation 216 is coupled into the distance measuring device 210 and then impinges, as illustrated in FIG. 5, on a receiving optical unit 252.

Two returning measurement beam bundles 249 and 250 for two different target object distances 248 are depicted for illustration by way of example in FIG. 5. For large object distances, where large can be interpreted as large relative to the focal length of the receiving optical unit 252, the optical measurement radiation 216 returning from the target object 215 is incident approximately parallel to the optical axis 251 of the photon detector 214. This case is represented by the measurement beam bundle 249 in the exemplary embodiment in FIG. 5. As the object distance becomes smaller, the retaining measurement radiation 216 incident in the distance measuring device is inclined more and more relative to the optical axis 251 of the photon detector 14 on account of a parallax. The beam bundle 250 is depicted in FIG. 5 as an example of such a retaining measurement beam bundle in the near range of the distance measuring device.

The receiving optical unit 252, which is likewise only symbolized schematically by an individual lens in FIG. 5, focuses the beam bundle of the retaining measurement radiation 216 onto a detection area 66 of a photon-sensitive element 5 provided in the photon detector 214. In this case, the receiving optical unit 252 is embodied with a photochromic material which becomes tinted to different extents depending on the impinging light intensity, such that the receiving optical unit 252 can simultaneously also perform the task of the photon transmission element 7.

The photon-sensitive element 5 has at least one light-sensitive SPAD for detecting the optical measurement radiation. By means of the SPAD(s) provided in the detection area 266, which can be arranged individually or in groups in a combined fashion in pixels in a matrix-like manner and are connected to an evaluation unit 236, the incident returning measurement radiation 216 is converted into an electrical signal 255 and fed for further evaluation in the evaluation unit 236. In this case, on account of inherent properties of the SPADs, the electrical signal 255 can be regarded as a digital signal which reproduces a pulse sequence of photons impinging on the respective pixels of the detection area 266.

The detection signals generated by an individual SPAD or a combination of SPADs can be fed to one or more distance determining unit(s) contained in an evaluation unit 236. The distance determining unit can sum the detection signals and generate therefrom a signal corresponding to a time-dependent intensity of the light signal impinging on the respective SPADs or the light intensity. By relating this signal to an excitation signal indicating the temporal profile of the photon rate emitted by the photon source, it is possible to deduce a photon time of flight from the photon source toward the target object and back again to the photon detector. If the photon source periodically modulates the emitted light sinusoidally, for example, it is possible to determine a time of flight from a phase difference between the emitted and detected measurement radiation. The distance from the target object can ultimately be deduced from the time of flight determined.

The invention claimed is:

1. A photon detector, comprising:
    a paralyzable photon-sensitive element, and
    a photon transmission element configured to receive a photon intensity from a source,
        wherein the photon transmission element is further configured to vary a photon intensity transmitted by the photon transmission element and impinging on the photon-sensitive element.

2. The photon detector as claimed in claim 1, wherein the photon transmission element is configured to reduce the transmitted photon intensity by varying absorption.

3. The photon detector as claimed in claim 1, wherein the photon transmission element is configured to vary the photon intensity transmitted by the photon transmission element and impinging on the photon-sensitive element in a manner dependent on the photon intensity from the source impinging on the photon transmission element.

4. The photon detector as claimed in claim 1, wherein the photon transmission element is configured to contribute to maximizing a photon counting rate of the paralyzable photon-sensitive element by varying the photon intensity transmitted by the photon transmission element and impinging on the photon-sensitive element.

5. The photon detector as claimed in claim 1, wherein the photon transmission element is configured to vary the transmitted photon intensity passively in a manner dependent on a photon intensity impinging on the photon transmission element.

6. The photon detector as claimed in claim 1, furthermore comprising a photon intensity measuring unit and a control unit, wherein the photon transmission element is configured to vary the transmitted photon intensity with the aid of the control unit actively in a manner dependent on a photon intensity measured by the photon intensity measuring unit.

7. The photon detector as claimed in claim 1, wherein the photon transmission element includes a photochromic material.

8. The photon detector as claimed in claim 1, wherein the photon transmission element includes an iris that is variable with regard to its opened cross section.

9. The photon detector as claimed in claim 1, wherein the photon transmission element includes liquid crystals.

10. The photon detector as claimed in claim 1, wherein the paralyzable photon-sensitive element includes at least one SPAD.

11. A distance measuring device for measuring a distance from a target object, comprising:
    a photon source configured to emit photons to the target object;
    a photon detector configured to detect photons returning from the target object; and
    an evaluation unit configured to determine the distance on the basis of a propagation time of photons,
    wherein the photon detector includes (i) a paralyzable photon-sensitive element, and (ii) a photon transmission element configured to receive a photon intensity from the photon source, and
    wherein the photon transmission element is further configured to vary a photon intensity transmitted by the photon transmission element and impinging on the photon-sensitive element.

\* \* \* \* \*